United States Patent
Maruyama (10) Patent No.: US 10,547,181 B2
(45) Date of Patent: Jan. 28, 2020

(54) CHARGING AND DISCHARGING CONTROL DEVICE, CHARGING AND DISCHARGING CONTROL SYSTEM, CHARGING AND DISCHARGING CONTROL METHOD, AND NON-TRANSITORY COMPUTER READABLE MEDIUM WITH CHARGING AND DISCHARGING CONTROL PROGRAM RECORDED THEREIN

(71) Applicant: MITSUBISHI HEAVY INDUSTRIES, LTD., Tokyo (JP)

(72) Inventor: Masanori Maruyama, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 16/053,122

(22) Filed: Aug. 2, 2018

(65) Prior Publication Data
US 2019/0044348 A1 Feb. 7, 2019

(30) Foreign Application Priority Data
Aug. 7, 2017 (JP) ................................ 2017-152601

(51) Int. Cl.
*H02J 7/00* (2006.01)

(52) U.S. Cl.
CPC .......... *H02J 7/0021* (2013.01); *H02J 7/0091* (2013.01)

(58) Field of Classification Search
CPC ............................ H02J 7/0021; H02J 7/0091
USPC ....................................................... 320/129
See application file for complete search history.

(56) References Cited

U.S. PATENT DOCUMENTS

| RE39,908 E | * | 11/2007 | Ikawa | H02J 3/32 |
| | | | | 320/136 |
| 9,276,432 B2 | * | 3/2016 | Kang | H01M 10/465 |
| 9,921,012 B2 | * | 3/2018 | Fujimoto | F28G 15/003 |
| 2010/0264737 A1 | * | 10/2010 | Chandler | H05B 33/0854 |
| | | | | 307/66 |
| 2011/0316486 A1 | * | 12/2011 | Inaba | B60L 1/003 |
| | | | | 320/150 |
| 2015/0346285 A1 | * | 12/2015 | Igarashi | B60L 58/16 |
| | | | | 324/432 |

FOREIGN PATENT DOCUMENTS

| JP | 8-17474 A | 1/1996 |
| JP | 2008-148408 A | 6/2008 |
| JP | 2009-011138 A | 1/2009 |
| JP | 2010-044895 A | 2/2010 |

* cited by examiner

Primary Examiner — M Baye Diao
(74) Attorney, Agent, or Firm — Westerman, Hattori, Daniels & Adrian, LLP (57) ABSTRACT

A charging and discharging control device is configured to control switching operations of a plurality of switching devices in a first control mode such that only a part of the plurality of battery groups are connected to the electrical load when a measured temperature of the battery pack has not reached a predetermined determination temperature when discharging of the battery pack is performed, and controls the switching operations of the plurality of switching devices in a second control mode such that all of the plurality of battery groups are connected to the electrical load when the measured temperature of the battery pack has reached the predetermined determination temperature when discharging of the battery pack is performed.

9 Claims, 8 Drawing Sheets

CHARGING AND DISCHARGING CONTROL DEVICE, CHARGING AND DISCHARGING CONTROL SYSTEM, CHARGING AND DISCHARGING CONTROL METHOD, AND NON-TRANSITORY COMPUTER READABLE MEDIUM WITH CHARGING AND DISCHARGING CONTROL PROGRAM RECORDED THEREIN

TECHNICAL FIELD

The present invention relates to a charging and discharging control device, a charging and discharging control system, a charging and discharging control method, and a non-transitory computer readable medium with a charging and discharging control program recorded therein.

This application claims priority based on Japanese Patent Application No. 2017-152601 filed in Japan on Aug. 7, 2017, the entire content of which is incorporated herein by reference.

BACKGROUND ART

As a secondary battery, a lithium ion battery using an electrolytic solution, a NaS battery, and the like have been known. These lithium ion batteries and NaS batteries have operable lower limit temperatures, for example, about 0° C. (at the time of charging) for the lower limit temperature of the lithium ion battery, and about 300° C. for the lower limit temperature of the NaS battery. Therefore, for example, when an air temperature is low, it is necessary to maintain the temperature of a secondary battery using a heater or the like such that it does not fall below the lower limit temperature.

In addition, an all-solid battery which has attracted attention in recent years has a wide operating temperature range such as being capable of charging and discharging the battery at about −30° C., but has an internal resistance rising at a low temperature like a conventional battery. Therefore, it is desirable to operate the all-solid battery at a high temperature (for example, about 150° C.) to fully exhibit its performance.

Patent Literature 1 discloses a technology that can heat a secondary battery without using a heater by using joule heat at the time of discharge of a NaS battery by performing charging and discharging between a plurality of NaS batteries constituting the secondary battery, that is, by performing control such that one NaS battery is discharged and the other NaS battery is charged.

CITATION LIST

Patent Literature

[Patent Literature 1]
Japanese Unexamined Patent Application, First Publication No. H8-17474

SUMMARY OF INVENTION

Technical Problem

However, in the technology disclosed in Patent Literature 1, since it is necessary to perform charging and discharging between the plurality of NaS batteries constituting the secondary battery, an SOC of the secondary battery cannot be used up to a fully charged state, and a capacity of the battery needs to be increased. Moreover, when an additional heater is used, a size of the device is increased according to a portion of the heater.

Therefore, a technology capable of heating a secondary battery without increasing the size of the secondary battery or surrounding devices is desired. An object of the present invention is to provide a charging and discharging control device, a charging and discharging control system, a charging and discharging control method, and a non-transitory computer readable medium with a charging and discharging control program recorded therein which can control charging and discharging of a battery pack to easily heat a secondary battery without increasing the size of the secondary battery or surrounding devices.

Solution to Problem

According to a first aspect of the present invention, a charging and discharging control device which is configured to control charging and discharging of a battery pack which includes a plurality of battery groups connected to an electrical load in parallel, and a plurality of switching devices each connected to the plurality of battery groups and performing a switching operation to switch between a connected state and a non-connected state of the plurality of battery groups to the electrical load includes a temperature measurement unit configured to measure a temperature of the battery pack, a temperature determination unit configured to receive an input of a measured temperature of the battery pack measured by the temperature measurement unit and to determine whether the measured temperature has reached a predetermined determination temperature, and a switching operation control unit configured to control the switching operations of the plurality of switching devices in a first control mode such that only a part of the plurality of battery groups are connected to the electrical load when the measured temperature of the battery pack has not reached the predetermined determination temperature when discharging of the battery pack is performed, and to control the switching operations of the plurality of switching devices in a second control mode such that all of the plurality of battery groups are connected to the electrical load when the measured temperature of the battery pack has reached the predetermined determination temperature when discharging of the battery pack is performed.

According to a second aspect of the present invention, in the charging and discharging control device according to the first aspect, in the first control mode, the switching operation control unit may control the switching operations of the plurality of switching devices such that the plurality of battery groups are sequentially connected to the electrical load one by one only for a predetermined connection time.

According to a third aspect of the present invention, in the charging and discharging control device according to the second aspect, the predetermined connection time may be set to the same time for all of the plurality of battery groups.

According to a fourth aspect of the present invention, in the charging and discharging control device according to the second aspect, the predetermined connection time may be set for each of the plurality of battery groups in accordance with an arrangement of the plurality of battery groups in the battery pack.

According to a fifth aspect of the present invention, in the charging and discharging control device according to any one of the first to fourth aspects, the switching device may be a switching element According to a sixth aspect of the present invention, in the charging and discharging control device according to any one of the first to fourth aspects, the switching device may be a DC/DC converter According to a seventh aspect of the present invention, a charging and discharging control system includes the charging and discharging control device according to any one of the first to sixth aspects, and the battery pack.

According to an eighth aspect of the present invention, a charging and discharging control method which is configured to control charging and discharging of a battery pack which includes a plurality of battery groups connected to an electrical load in parallel, and a plurality of switching devices each connected to the plurality of battery groups and performing a switching operation to switch between a connected state and a non-connected state of the plurality of battery groups to the electrical load includes a temperature measurement step of measuring a temperature of the battery pack, a temperature determination step of receiving an input of a measured temperature of the battery pack measured in the temperature measurement step and determining whether the measured temperature has reached a predetermined determination temperature, and a switching operation control step of controlling the switching operations of the plurality of switching devices in a first control mode such that only a part of the plurality of battery groups are connected to the electrical load when the measured temperature of the battery pack has not reached the predetermined determination temperature when discharging of the battery pack is performed, and of controlling the switching operations of the plurality of switching devices in a second control mode such that all of the plurality of battery groups are connected to the electrical load when the measured temperature of the battery pack has reached the predetermined determination temperature when discharging of the battery pack is performed.

According to a ninth aspect of the present invention, a charging and discharging control program recorded in non-transitory computer readable medium is configured to cause a computer as a charging and discharging control device for controlling charging and discharging of a battery pack that includes a plurality of battery groups connected to an electrical load in parallel, and a plurality of switching devices each connected to the plurality of battery groups and performing a switching operation to switch between a connected state and a non-connected state of the plurality of battery groups to the electrical load to function as a temperature measurement unit configured to measure a temperature of the battery pack, a temperature determination unit configured to receive an input of a measured temperature of the battery pack measured by the temperature measurement unit and to determine whether the measured temperature has reached a predetermined determination temperature, and a switching operation control unit configured to control the switching operations of the plurality of switching devices in a first control mode such that only a part of the plurality of battery groups are connected to the electrical load when the measured temperature of the battery pack has not reached the predetermined determination temperature when discharging of the battery pack is performed, and to control the switching operations of the plurality of switching devices in a second control mode such that all of the plurality of battery groups are connected to the electrical load when the measured temperature of the battery pack has reached the predetermined determination temperature when discharging of the battery pack is performed.

Advantageous Effects of Invention

According to at least one of the aspects described above, a charging and discharging control device can control charging and discharging of a battery pack so as to easily heat a secondary battery without increasing size of the secondary battery or surrounding devices.

DESCRIPTION OF EMBODIMENTS

First Embodiment

Figure 1:
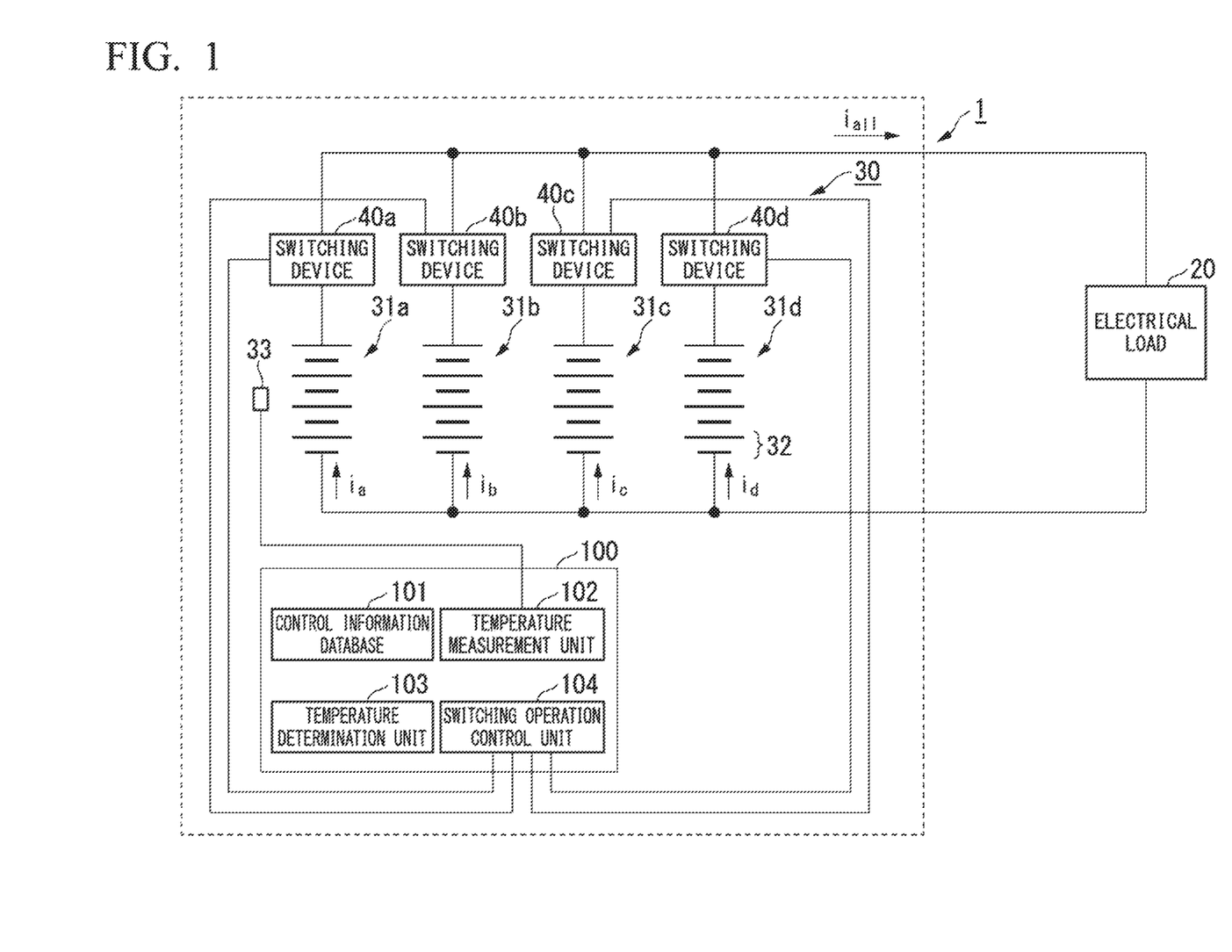
FIG. 1 is a schematic diagram which shows an overall configuration of a charging and discharging control system according to a first embodiment.

Hereinafter, embodiments will be described in detail with reference to drawings. FIG. 1 is a schematic diagram which shows an overall configuration of a charging and discharging control system 1 according to a first embodiment of the present invention.

The charging and discharging control system 1 according to the first embodiment is used to control charging and discharging of a battery pack (assembled battery) 30 connected to an electrical load 20 such as a motor, for example. The charging and discharging control system 1 includes the battery pack 30 connected to the electrical load 20, and a charging and discharging control device 100 which controls the charging and discharging of the battery pack 30.

The battery pack 30 includes four battery groups 31a to 31d, and four switching devices 40a to 40d which perform a switching operation for switching between a connected state and a non-connected state of each of the four battery groups 31a to 31d to the electrical load 20. The number of battery groups constituting the battery pack 30 may be other than 4 as long as it is plural. The four battery groups 31a to 31d are configured to be connected in parallel. In addition, the battery groups 31a to 31d are each configured with four batteries 32 which are all-solid batteries and connected in series. The number of batteries 32 constituting each battery group 31 may be other than 4. In the first embodiment of the present invention, the battery 32 is, for example, an all-solid lithium ion battery in which the electrolyte is a solid, but, for example, other all-solid batteries or secondary batteries other than all-solid batteries (a lithium ion battery using a liquid electrolyte, a NaS battery, and the like) may also be used.

In addition, the battery pack 30 has a temperature sensor 33 which senses a temperature of the battery pack 30. The temperature sensor 33 is provided in the vicinity of a battery group 31a in the first embodiment of the present invention, but may also be provided in the vicinity of other battery groups 31b to 31d or at other positions as long as the other positions are positions at which the temperature of the battery pack 30 can be measured. In addition, the number of temperature sensors 33 may also be two or more.

The four switching devices 40a to 40d are connected to the battery groups 31a to 31d, respectively. That is, the switching device 40a is connected to the battery group 31a, a switching device 40b is connected to a battery group 31b, a switching device 40c is connected to a battery group 31c, and a switching device 40d is connected to a battery group 31d. The number of switching devices 40 constituting the battery pack 30 may also be other than 4. The switching devices 40a to 40d are configured to perform a switching operation for switching between the connected state (a state of being connected) and the non-connected state (a state of being non-connected) of the connected battery group 31a to 31d to the electrical load 20, respectively.

Figure 2:
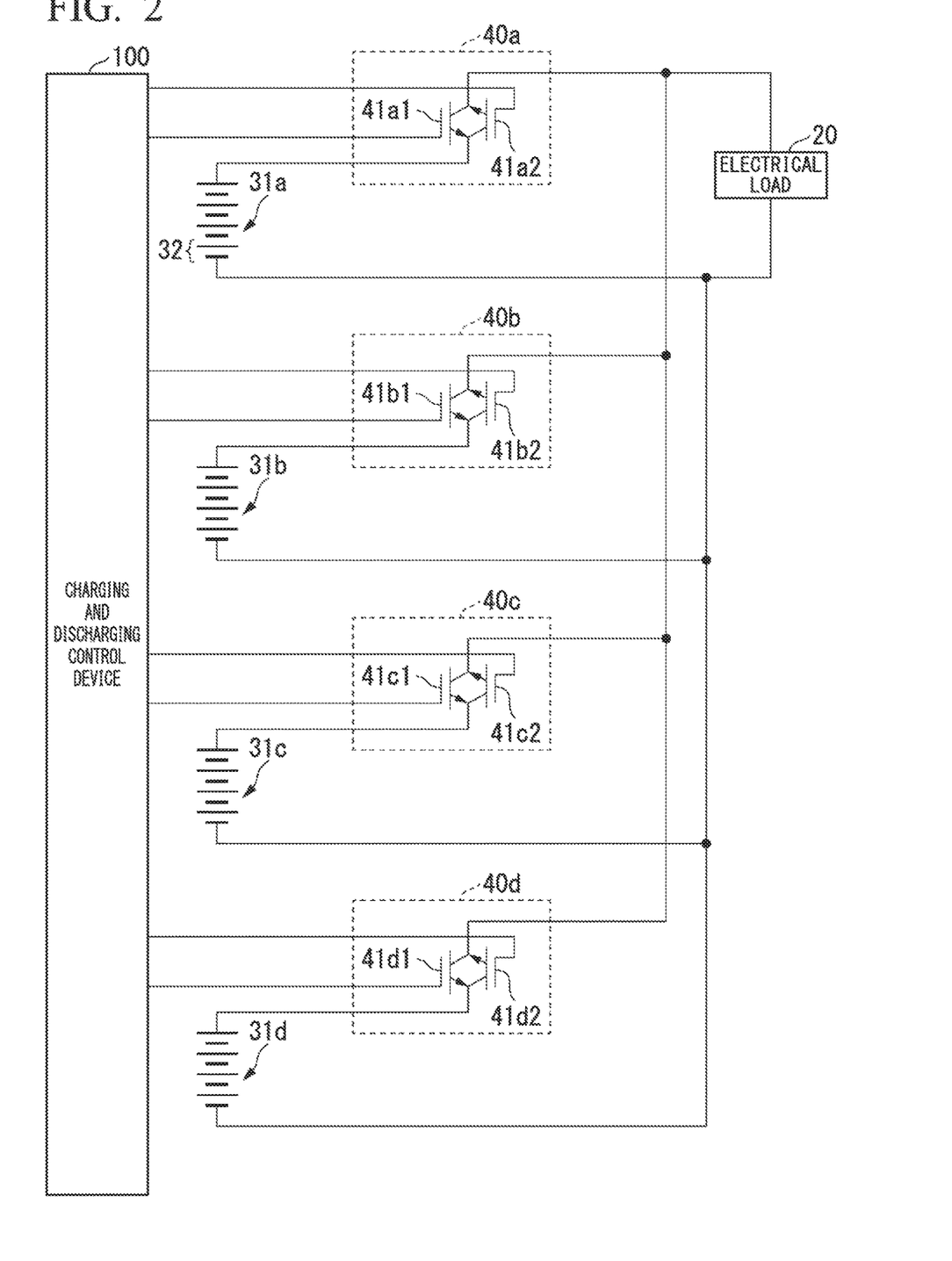
FIG. 2 is an explanatory diagram which describes a configuration of a switching device included in the charging and discharging control system according to the first embodiment.

FIG. 2 is an explanatory diagram which describes a configuration of switching devices 40a to 40d included in the charging and discharging control system 1 according to the first embodiment.

As shown in FIG. 2, the charging and discharging control system 1 according to the first embodiment of the present invention includes switching elements 41a1 to 41d1 and 41a2 to 41d2 such as an insulated-gate bipolar transistor (IGBT) as the switching devices 40a to 40d. As a switching device, for example, other switching elements such as a bipolar transistor or a power MOSFET may also be used. In addition, as a switching device, a switching circuit configured by combining a plurality of circuit elements to enable a switching operation may also be used.

Gates of the eight switching elements 41a1 to 41d1 and 41a2 to 41d2 are all connected to the charging and discharging control device 100 (a switching operation control unit 104). The switching elements 41a1 to 41d1 and 41a2 to 41d2 are configured to perform a switching operation for switching between a state in which the battery groups 31a to 31d are connected to the electrical load 20 (a connected state) and a state in which they are not connected to each other (a non-connected state) according to an ON or OFF signal sent from the switching operation control unit 104 of the charging and discharging control device 100. Before starting of charging and discharging control processing, the eight switching elements 41a1 to 41d1 and 41a2 to 41d2 are in the non-connected state in which none of the battery groups 31a to 31d is connected to the electrical load 20.

The charging and discharging control device 100 includes a control information database 101 which stores necessary control information to control the charging and discharging of the battery pack 30, a temperature measurement unit 102 which measures the temperature of the battery pack 30, a temperature determination unit 103 which determines whether a measured temperature of the battery pack 30 measured by the temperature measurement unit 102 has reached a predetermined determination temperature, and a switching operation control unit 104 which controls switching operations of the four switching devices 40a to 40d in a first control mode or a second control mode to be described below.

The control information database 101 stores, for example, measured temperature information indicating a measured temperature of the battery pack 30, determination temperature information indicating a determination temperature of the battery pack 30, number information indicating the number of battery groups constituting the battery pack 30, connection time information indicating a connection time allocated to each of the battery groups constituting the battery pack 30, connection status information indicating a connection status of each of the battery groups constituting the battery pack 30 to an electrical load, and the like as control information necessary for controlling the charging and discharging of the battery pack 30. For example, the connection status information may be connection statuses such as "connected" indicating a connection to an electrical load, "non-connected (with no connection processing)" indicating no connection to an electrical load and that connection processing has not been performed, and "non-connected (with connection processing)" indicating no connection to an electrical load but that connection processing has been performed in the past. Moreover, the control information database 101 may store other types of information necessary for controlling the charging and discharging of the battery pack 30.

The temperature measurement unit 102 is connected to the temperature sensor 33, measures the temperature of the battery pack 30 via the temperature sensor 33, and outputs a measured temperature of the battery pack 30 to the temperature determination unit 103. The temperature measurement unit 102 may store the measured temperature of the battery pack 30 together with a measurement time in the control information database 101 as measured temperature information.

The temperature determination unit 103, if the measured temperature of the battery pack 30 measured by the temperature measurement unit 102 is input, determines whether the measured temperature of the battery pack 30 has reached a predetermined determination temperature by referring to the control information database 101. In the first embodiment of the present invention, the predetermined determination temperature is set to, for example, 100° C., but may also be set to a desired temperature in accordance with a type, an application, an environment, and the like of an all-solid battery which is an object of charging and discharging control. The temperature determination unit 103 outputs a determination result to the switching operation control unit 104.

The switching operation control unit 104 controls the switching operations of the four switching devices 40*a* to 40*d* in either a first control mode or a second control mode in accordance with the determination result input by the temperature determination unit 103. In the first control mode, the switching operation control unit 104 controls the switching operation of each of the switching devices 40*a* to 40*d* such that only a part of the four battery groups 31*a* to 31*d* are connected to the electrical load 20. In the second control mode, the switching operation control unit 104 controls the switching operation of each of the switching devices 40*a* to 40*d* such that all of the four battery groups 31*a* to 31*d* are connected to the electrical load 20.

In the first embodiment of the present invention, when controlling the switching operations of the switching devices 40*a* to 40*d* in the first control mode, the switching operation control unit 104 changes the control mode from the first control mode to the second control mode in accordance with the determination result input by the temperature determination unit 103 or after all of the four battery groups 31*a* to 31*c* are connected to the electrical load 20 for a predetermined time. The switching operation control unit 104 may refer to the control information database 101 when necessary.

Figure 3:
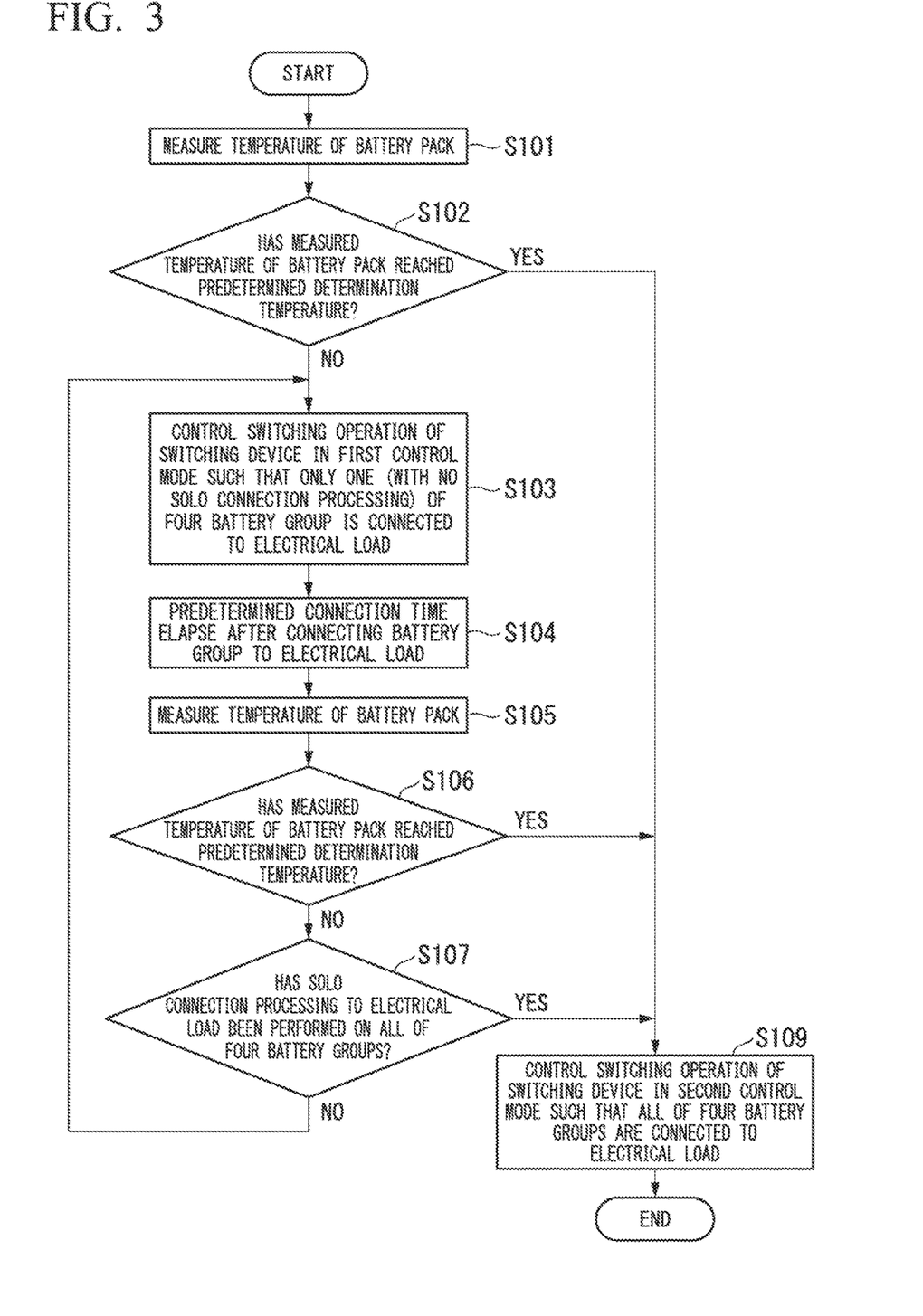
FIG. 3 is a flowchart which shows an operation of a charging and discharging control device included in the charging and discharging control system according to the first embodiment.

FIG. 3 is a flowchart which describes an operation of the charging and discharging control device 100 included in the charging and discharging control system 1 according to the first embodiment.

The operation of the charging and discharging control device 100 according to the first embodiment will be described with reference to FIG. 3.

For example, processing of a flowchart shown in FIG. 3 is started when the discharging of the battery pack 30 is started as in the case when an operation of the electrical load 20 such as a motor is started using power of the battery pack 30. If the processing is started, the temperature measurement unit 102 of the charging and discharging control device 100 measures the temperature of the battery pack 30 on the basis of a signal input from the temperature sensor 33 (step S101). The measured temperature of the battery pack 30 measured by the temperature measurement unit 102 is input to the temperature determination unit 103. The temperature determination unit 103 acquires determination temperature information of the battery pack 30 by referring to the control information database 101. The temperature determination unit 103 compares the measured temperature of the battery pack 30 input by the temperature measurement unit 102 with the determination temperature of the battery pack 30, and determines whether the measured temperature of the battery pack 30 has reached a predetermined determination temperature (step S102).

When the measured temperature of the battery pack 30 is equal to or more than the predetermined determination temperature, the temperature determination unit 103 determines that the measured temperature of the battery pack 30 has reached a predetermined determination temperature (YES in step S102), and inputs the determination result to the switching operation control unit 104. When a determination result that the measured temperature of the battery pack 30 has reached a predetermined determination temperature is input, the switching operation control unit 104 controls the switching operations of the four switching devices 40*a* to 40*d* in the second control mode such that all of the four battery groups are connected to the electrical load 20 (step S109). That is, the switching operation control unit 104 sends a signal for switching ON to all of the eight switching elements 41*a*1 to 41*d*1 and 41*a*2 to 41*d*2 shown in FIG. 2, and performs control such that all of the connections between the battery groups 31*a* to 31*d* and the electrical load 20 are in the connected state. As a result, processing of the charging and discharging control device 100 of the charging and discharging control system 1 ends.

On the other hand, when the measured temperature of the battery pack 30 is lower than the predetermined determination temperature, the temperature determination unit 103 determines that the measured temperature of the battery pack 30 has not reached the predetermined determination temperature (NO in step S102), and inputs the determination result to the switching operation control unit 104.

The switching operation control unit 104 controls the switching operations of the four switching devices in the first control mode such that only a part of the four battery groups 31*a* to 31*d* are connected to the electrical load 20 if a determination result that the measured temperature of the battery pack 30 has not reached the predetermined determination temperature is input (step S103). In the first embodiment of the present invention, the switching operations of the four switching devices 40*a* to 40*d* are controlled in the first control mode such that only one battery group, as a part of the four battery groups, is connected to the electrical load 20. For example, the switching operation control unit 104 may send a signal for switching ON to switching elements 41*a*1 and 41*a*2 connected to the battery group 31*a*, and sends a signal for switching OFF to the switching elements 41*b*1 to 41*d*1 and 41*b*2 to 41*d*2 connected to the remaining battery groups 31*b* to 31*d* among the eight switching elements 41*a*1 to 41*d*1 and 41*a*2 and 41*d*2 shown in FIG. 2, thereby performing control such that only the battery group 31*a* is connected to the electrical load 20. The switching elements 41*a*1 and 41*a*2 are switched ON according to an input signal, and thereby the battery group 31*a* is brought into a connected state to the electrical load 20 and performs discharging. In addition, the switching elements 41*b*1 to 41*d*1 and 41*b*2 to 41*d*2 are switched OFF according to an input signal, and thereby the other battery groups 31*b* to 31*d* maintain the non-connected state and do not perform discharging.

In the first embodiment of the present invention, when control is performed in the first control mode, control is performed such that only one battery group, as a part of the plurality of battery groups, is connected to the electrical load, but control may also be performed such that two or more battery groups, as a part of the plurality of battery groups, are connected to the electrical load.

In addition, in the first embodiment of the present invention, control is performed such that a battery group on which solo connection processing has not been performed is connected to the electrical load 20 as one battery group connected to the electrical load 20 among the four battery groups 31a to 31d, but since the connection processing has not been performed on any of the battery groups immediately after the flow shown in FIG. 3 is started, that is, when the processing proceeds from step S101 to step S102, any of the four battery groups 31a to 31d may be selected.

On the other hand, when the processing returns to step S103 with a NO route of step S107 via the processing of step S104 to step S107 to be described below, that is, when the processing of step S103 is performed for twice or more, the switching operation control unit 104 selects one battery group on which the solo connection processing to the electrical load 20 has not been performed among the four battery groups 31a to 31d, and performs control such that this only one battery group is connected to the electrical load 20. For example, the switching operation control unit 104 may acquire the connection status information on all of the battery groups 31a to 31d with reference to the control information database 101, and select any one of the battery groups having the connection status of "non-connected (with no connection processing)" indicating that the connection processing has not been performed on the battery groups 31a to 31d as an object of the connection processing.

The switching operation control unit 104 may perform control such that only the battery group 31a is connected to the electrical load 20, and then acquires connection time information allocated to respective battery groups constituting the battery pack 30 by referring to the control information database 101. The switching operation control unit 104 may also acquire the connection time information from the control information database 101 in advance. The switching operation control unit 104 waits until a predetermined connection time elapses after connecting the battery group 31a to the electrical load 20 (step S104), and outputs a temperature measurement instruction to the temperature measurement unit 102. In the first embodiment of the present invention, the predetermined connection time may be set to, for example, 5 seconds which is the same for all of the four battery groups 31a to 31d. This predetermined connection time is preferably set to a time to an extent at which a difference in voltages (electromotive forces) of the battery groups 31a to 31d can be ignored when control is performed such that connections between all of the four battery groups 31a to 31d and the electrical load 20 are in the connected state, that is, when the battery groups 31a to 31d are controlled in the second control mode. Therefore, the switching operation control unit 104 outputs a temperature measurement instruction to the temperature measurement unit 102 five seconds after sending a signal for switching ON to the switching elements 41a1 and 41a2 connected to the battery group 31a.

If a temperature measurement instruction is input from the switching operation control unit 104, the temperature measurement unit 102 measures the temperature of the battery pack 30 on the basis of a signal input from the temperature sensor 33 (step S105). The measured temperature of the battery pack 30 measured by the temperature measurement unit 102 is input to the temperature determination unit 103. The temperature determination unit 103 acquires the determination temperature information of the battery pack 30 by referring to the control information database 101. The temperature determination unit 103 may hold the determination temperature information of the battery pack 30 acquired in a previous processing (for example, step S102 or the like). The temperature determination unit 103 compares the measured temperature of the battery pack 30 input by the temperature measurement unit 102 with the determination temperature of the battery pack 30, and determines whether the measured temperature of the battery pack 30 has reached a predetermined determination temperature (step S106).

The temperature determination unit 103, if the measured temperature of the battery pack 30 is equal to or higher than a predetermined determination temperature, determines that the measured temperature of the battery pack 30 has reached the predetermined determination temperature (YES in step S106), and inputs a determination result to the switching operation control unit 104. The switching operation control unit 104, if a determination result that the measured temperature of the battery pack 30 has reached a predetermined determination temperature is input, controls the switching operations of the four switching devices 40a to 40d in the second control mode such that all of the four battery groups are connected to the electrical load 20 (step S109). That is, the switching operation control unit 104 sends a signal for switching ON to all of the eight switching elements 41a1 to 41d1 and 41a2 to 41d2 shown in FIG. 2, and performs control such that all of the connections between the battery groups 31a to 31d and the electrical load 20 are in the connected state. As a result, the processing of the charging and discharging control device 100 of the charging and discharging control system 1 ends.

On the other hand, when the measured temperature of the battery pack 30 is lower than a predetermined determination temperature, the temperature determination unit 103 determines that the measured temperature of the battery pack 30 has not reached the predetermined determination temperature (NO in step S106), and inputs a determination result to the switching operation control unit 104. The switching operation control unit 104, if a determination result that the measured temperature of the battery pack 30 has not reached the predetermined determination temperature is input, determines whether connection processing (that is, heating of the battery pack 30 due to discharging) to the electrical load has been performed on all of the four battery groups 31a to 31d by referring to the control information database 101 (step S107). For example, the switching operation control unit 104 may acquire the connection status information of all of the battery groups 31a to 31d by referring to the control information database 101, and determine whether the connection processing to the electrical load has been performed on all of the four battery groups 31a to 31d depending on whether there is a battery group having a connection status of "non-connected (with no connection processing)" indicating that solo connection processing has not been performed among the battery groups 31a to 31d. When there is no battery group having a connection status of "non-connected (with no connection processing)" among the battery groups 31a to 31d, the switching operation control unit 104 determines that the connection processing to the electrical load has been performed on all of the four battery groups 31a to 31d (YES in step S107).

When it is determined that the connection processing to the electrical load has been performed on all of the four battery groups 31a to 31d (YES in step S107), the switching operation control unit 104 controls the switching operations of the four switching devices 40a to 40d in the second control mode such that all of the four battery groups are connected to the electrical load 20 (step S109). That is, the switching operation control unit 104 sends a signal for switching ON to all of the eight switching elements 41a1 to 41d1 and 41a2 to 41d2 shown in FIG. 2, and performs control such that all of the connections between the battery groups 31a to 31d and the electrical load 20 are in the connected state. As a result, the processing of the charging and discharging control device 100 of the charging and discharging control system 1 ends.

In the first embodiment of the present invention, with respect to the four battery groups 31a to 31d, solo connection processing to the electrical load 20 (that is, the heating of the battery pack 30 due to discharging) is limited to once, and after the solo connection processing is performed on all of the battery groups 31a to 31d, even when the measured temperature of the battery pack 30 has not reached a predetermined determination temperature, control is performed by changing the control mode from the first control mode to the second control mode (processing proceeding from YES of step S107 to step S109), but control may be performed such that the solo connection processing is performed on each of the battery groups 31a to 31d twice or more.

On the other hand, when even one battery group having the connection status of "non-connected (with no connection processing)" among the battery groups 31a to 31d exists, the switching operation control unit 104 determines that the connection processing to the electrical load has not been performed on all of the four battery groups 31a to 31d (NO in step S107). When the switching operation control unit 104 determines that the connection processing to the electrical load has not been performed on all of the four battery groups 31a to 31d (NO in step S107), the processing returns to step S103, and the above processing is repeated again.

Effect of the Charging and Discharging Control Device According to the First Embodiment FIGS. 4A to 4J are explanatory diagrams which describe the operation and effects of the charging and discharging control device 100 included in the charging and discharging control system 1 according to the first embodiment.

The operation and effects of the charging and discharging control device 100 according to the first embodiment of the present invention will be described with reference to FIGS. 1 and 4.

FIGS. 4A to 4E show graphs of heat amount generated at the time of discharge of the battery groups 31a to 31d and the battery pack 30, respectively, when the present invention is not applied, that is, when all of the four battery groups 31a to 31d are connected to the electrical load 20 and discharged.

On the other hand, FIGS. 4F to 4J shows graphs of heat amount generated at the time of discharge of the battery group 31a to 31d and the battery pack 30, respectively, when the present invention is applied, that is, when only one of the four battery groups 31a to 31d is sequentially connected to the electrical load 20 and discharged under control of the charging and discharging control device 100. In each of FIGS. 4A to 4J, the horizontal axis represents time (unit is [s]) and the vertical axis represents the heat amount per unit time (unit is [J/s]).

Total Calorific Value of Battery Pack when the Present Invention is Not Applied First, in a case in which the present invention is not applied, that is, in a case in which all of the four battery groups 31a to 31d are connected to the electrical load 20 and discharged, a total calorific value of the battery pack 30 will be calculated.

As shown in FIG. 1, if respective currents flowing in the four battery groups 31a to 31d are set to currents $i_a$ to $i_d$ [A], a total current $i_{all}$ flowing in the electrical load 20 is represented by the following equation.

$$i_{all}=i_a+i_b+i_c+i_d$$

Since all of the four battery groups 31a to 31d have the same internal resistance r[Ω], respective current values $i_a$ to $i_d$ are the same value, and the following equation is established if this is set to a current i [A].

$$i_a=i_b=i_c=i_d=i$$

$$i_{all}=i_a+i_b+i_c+i_d=4i$$

In addition, a heat amount $Q_1$ [J/s] per unit time at the time of discharge of each of the four battery groups 31a to 31d is calculated by the following equation.

$$Q_1=(i\times r)\times i^2 r[J/s]$$

Therefore, a total calorific value $Q_{1t}$ of each of the four battery groups 31a to 31d discharged for 4t[s] is calculated by the following equation.

$$Q_{1t}=Q_1\times 4t=4i^2 rt[J]$$

The total calorific value $Q'_{1t}$ corresponds to area portions of the graphs of FIGS. 4A to 4D. The total calorific value $Q'_{1t}$ of the battery pack 30 constituted by the four battery groups 31a to 31d can be obtained by adding the total calorific values $Q_{1t}$ of the four battery groups 31a to 31d, and is calculated by the following equation.

$$Q'_{1t}=Q_{1t}\times 4=4i^2 rt\times 4=16i^2 rt[J]$$

Figure 4A:
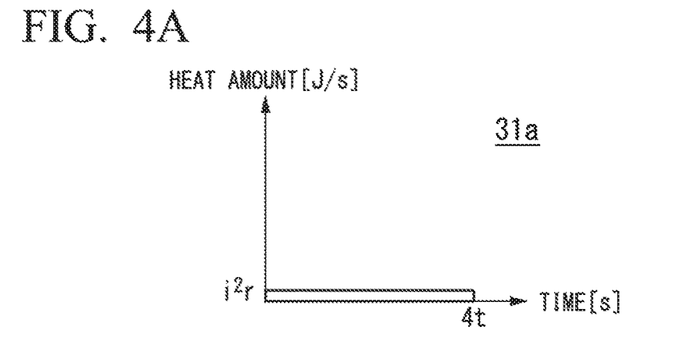
FIG. 4A is an explanatory diagram which describes an operation and effects of the charging and discharging control device included in the charging and discharging control system according to the first embodiment.
Figure 4B:
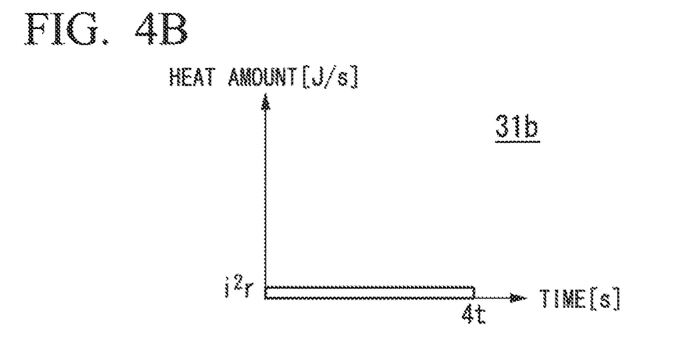
FIG. 4B is an explanatory diagram which describes an operation and effects of the charging and discharging control device included in the charging and discharging control system according to the first embodiment.
Figure 4C:
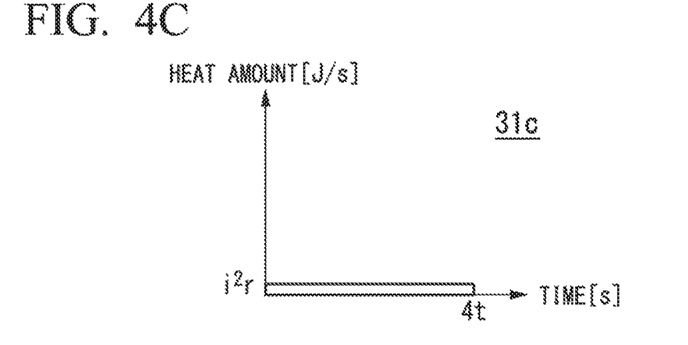
FIG. 4C is an explanatory diagram which describes the operation and effects of the charging and discharging control device included in the charging and discharging control system according to the first embodiment.
Figure 4D:
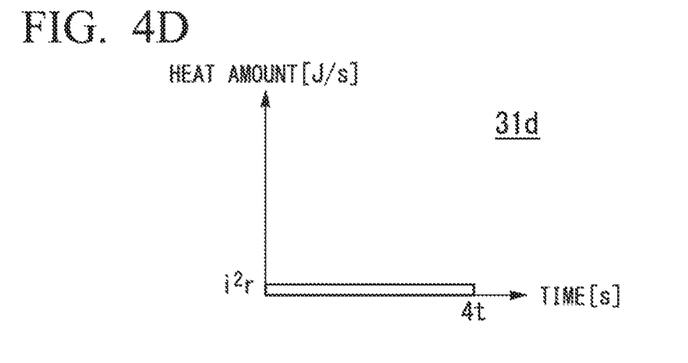
FIG. 4D is an explanatory diagram which describes the operation and effects of the charging and discharging control device included in the charging and discharging control system according to the first embodiment.
Figure 4E:
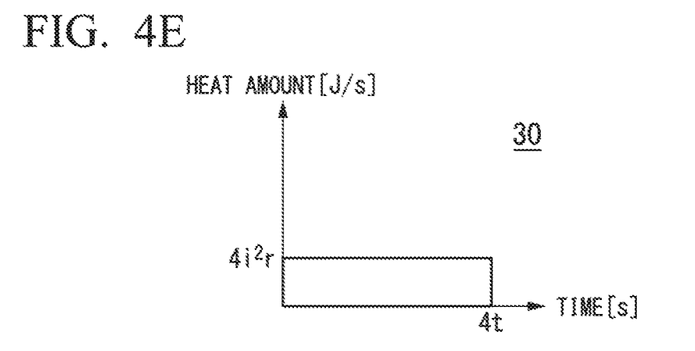
FIG. 4E is an explanatory diagram which describes the operation and effects of the charging and discharging control device included in the charging and discharging control system according to the first embodiment.
Figure 4F:
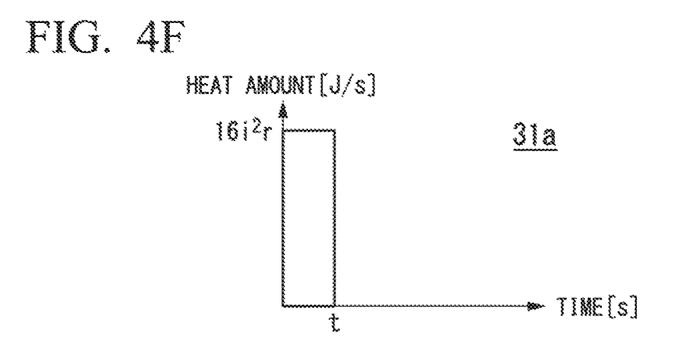
FIG. 4F is an explanatory diagram which describes the operation and effects of the charging and discharging control device included in the charging and discharging control system according to the first embodiment.
Figure 4G:
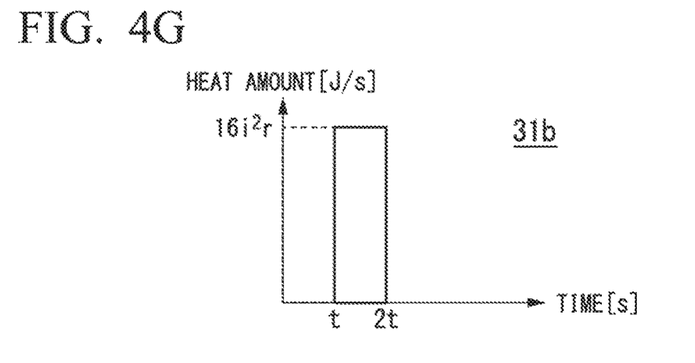
FIG. 4G is an explanatory diagram which describes the operation and effects of the charging and discharging control device included in the charging and discharging control system according to the first embodiment.
Figure 4H:
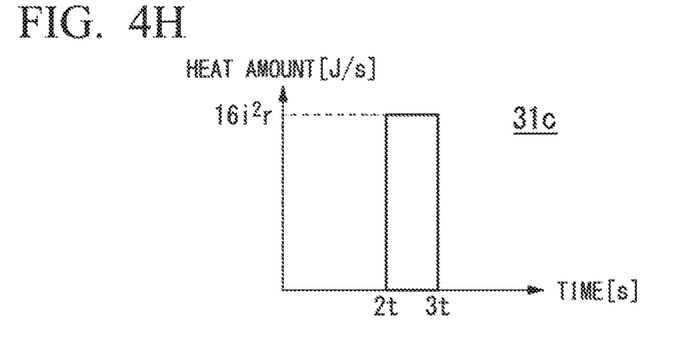
FIG. 4H is an explanatory diagram which describes the operation and effects of the charging and discharging control device included in the charging and discharging control system according to the first embodiment.
Figure 4I:
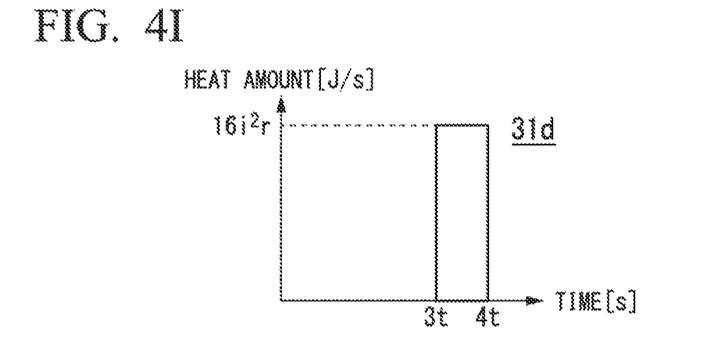
FIG. 4I is an explanatory diagram which describes the operation and effects of the charging and discharging control device included in the charging and discharging control system according to the first embodiment.

The total calorific value $Q'_{1t}$ corresponds to an area portion of a graph of FIG. 4E.

Total Calorific Value of Battery Pack when the Present Invention is Applied

Next, in a case in which the present invention is applied, that is, in a case in which only one of the four battery groups 31a to 31d is sequentially connected to the electrical load 20 and discharged under control of the charging and discharging control device 100, the total calorific value of the battery pack 30 will be calculated.

In the case in which the present invention described above is not applied, a current flowing in one battery group is i[A] since all of the four battery groups 31a to 31d discharge, but in the first control mode of the first embodiment of the present invention, a current with the same value as $i_{all}$ which is a sum of currents of the four battery groups in a case in which the present invention described above is not applied, that is, a current of 4i [A], flows since only one battery group discharges. Therefore, a heat amount $Q_2$[J/s] per unit time at the time of discharge of each of the four battery groups 31a to 31d is calculated by the following equation.

$$Q_2=(4i\times r)\times 4i=16i^2 r[J/s]$$

Here, a total connection time of the four battery groups 31a to 31d is set to 4t[s] which is the same as when the present invention is not applied to compare it with a total calorific value of the battery pack when the present invention is not applied described above. That is, as shown in FIGS. 4F to 4I, when the present invention is applied, each of the four battery groups 31a to 31d is connected to the electrical load 20 and subjected to discharging for the same predetermined connection time t[s].

Therefore, each of the four battery groups 31a to 31d has a total calorific value $Q_{2t}$ calculated by the following equation when it is discharged for t[s].

$$Q_2t = Q_2 \times t = 16i^2rt[J]$$

The total calorific value $Q_{2t}$ corresponds to an area portion of each of the graphs of FIGS. 4F to 4I. The total calorific value $Q'_{2t}$ of the battery pack 30 constituted by the four battery groups 31a to 31d can be obtained by adding the total calorific values $Q_{2t}$ of the four battery groups 31a to 31d, and calculated by the following equation.

$$Q'_2t = Q_2 \times 4 = 16i^2rt \times 4 = 64i^2rt[J]$$

Figure 4J:
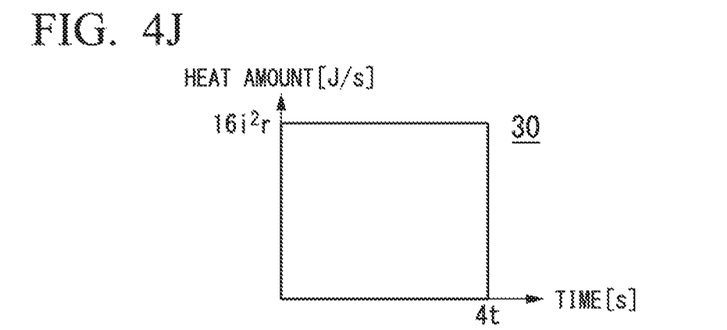
FIG. 4J is an explanatory diagram which describes the operation and effects of the charging and discharging control device included in the charging and discharging control system according to the first embodiment.

Total calorific value $Q'_{2t}$ corresponds to an area portion of the graph of FIG. 4J.

Comparison Result of Total Calorific Value

As can be understood from what is described above, the total calorific value $Q'_2t$ of a battery when the present invention is applied is much larger than four times the total calorific value $Q'_{1t}$ of the battery pack when the present invention is not applied. This can be visually confirmed easily by comparing areas of the graphs of FIGS. 4E and 4F. That is, according to the first embodiment of the present invention, it is possible to increase the total calorific value of the battery pack much larger than when the present invention is not applied, and to heat the battery pack (a secondary battery) up to an optimum operation temperature in an extremely efficient manner.

In the above calculation for calculating the total calorific value, a case in which there are four battery groups constituting the battery pack has been described, but, as apparent from the above calculation, when there are n battery groups constituting the battery pack, the total calorific value of the battery pack when the present invention is applied is n times larger than the total calorific value when the present invention is not applied. Therefore, it is possible to further exhibit heating effects of the present invention by using more battery groups.

Furthermore, according to the first embodiment of the present invention, as described with reference to the flowchart of FIG. 3, since it is possible to achieve efficient heating of a secondary battery by performing control such that only a part of a plurality of battery groups constituting the battery pack are connected to the electrical load without using additional heating device such as a heater, implementation becomes extremely easy and furthermore a useful effect that the size of the secondary battery or surrounding devices is not increased is obtained.

Modified Example of the First Embodiment

Next, a modified example of the first embodiment of the present invention mentioned above will be described.

Figure 5:
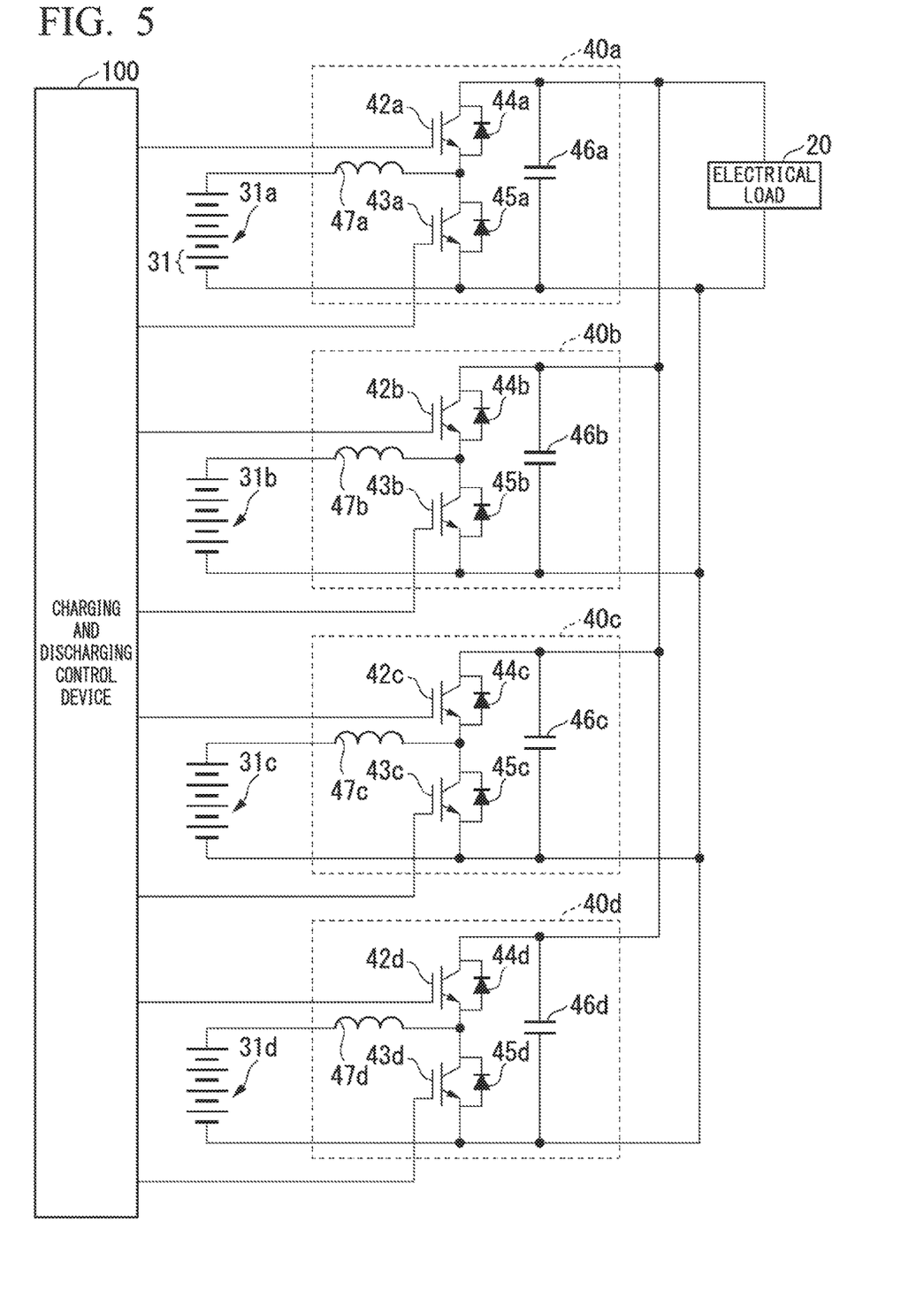
FIG. 5 is an explanatory diagram which describes a configuration of a switching device included in a charging and discharging control system according to a modified example of the first embodiment.

FIG. 5 is an explanatory diagram which describes a configuration of the switching devices 40a to 40d included in a charging and discharging control system 1 according to the modified example of the first embodiment.

As shown in FIG. 5, a charging and discharging control system 1 according to the modified example of the first embodiment of the present invention includes DC/DC converters 40a to 40d as the switching devices 40a to 40d. The charging and discharging control system 1 shown in FIG. 5 includes all the same constituents as the first embodiment shown in FIG. 2 except that the charging and discharging control system 1 shown in FIG. 5 includes the DC/DC converters 40a to 40d as the switching devices 40a to 40d. As shown in FIG. 5, a DC/DC converter 40a includes switching elements 42a and 43a such as an insulated-gate bipolar transistor (IGBT), diodes 44a and 45a, a capacitor 46a, and a coil 47a as an inductor. Likewise, the DC/DC converters 40b to 40d include switching elements 42b to 42d and 43b to 43d such as an insulated-gate bipolar transistor (IGBT), diodes 44b to 44d and 45b to 45d, capacitors 46b to 46d, and coils 41b to 47d as an inductor, respectively.

Since all of the DC/DC converters 40a to 40d have the same configuration, a configuration of the DC/DC converter 40a will be described in the following description. The capacitor 46a is connected to the battery group 31a in parallel. The coil 47a is connected to the battery group 31a in series. The switching element 42a is connected between the coil 47a and one pole side of the capacitor 46a, and the switching element 43a is connected between the coil 47a and the other pole side of the capacitor 46a. The switching element 43a forms a closed circuit with the battery group 31a and the coil 47a in a state in which the switch is closed.

The diode 44a is connected between a collector terminal and an emitter terminal of the switching element 42a such that the emitter terminal side becomes an anode terminal. A gate of the switching element 42a is connected to the charging and discharging control device 100. The switching element 42a is configured to switch between a state in which the collector terminal and the emitter terminal are connected (a connected state) and a state in which they are not connected (a non-connected state) according to a switch ON or OFF signal sent from the switching operation control unit 104 of the charging and discharging control device 100.

The diode 45a is connected between the collector terminal and the emitter terminal of the switching element 43a such the emitter terminal side becomes an anode terminal. A gate of the switching element 43a is connected to the charging and discharging control device 100. The switching element 43a is configured to switch between the state in which the collector terminal and the emitter terminal are connected (the connected state) and the state in which they are not connected (a non-connected state) according to a switch ON or OFF signal sent from the switching operation control unit 104 of the charging and discharging control device 100.

The switching elements 42b to 42d and 43b to 43d, the diodes 44b to 44d and 45b to 45d, the capacitors 46b to 46d, and coils 47b to 47d included in each of the DC/DC converters 40b to 40d have the same configuration as respective constituents of the DC/DC converter 40a described above.

The charging and discharging control device 100 is configured to perform a switching operation for switching between the connected state and the non-connected state between each of the battery groups 31a to 31d and the electrical load 20 by sending an ON or OFF signal to the switch of the switching elements 42a to 42d and the switching elements 43a to 43d included in each of the DC/DC converters 40a to 40d, and switching between the connected state and the non-connected state of the switching elements 42a to 42d and the switching elements 43a to 43d. Furthermore, the charging and discharging control device 100 sends an ON or OFF signal to the switch of the switching elements 42a to 42d and the switching elements 43a to 43d included in each of the DC/DC converters 40a to 40d, and switches between the connected state and the non-connected state of the switching elements 42a to 42d and the switching elements 43a to 43d, and thereby, a voltage applied to the electrical load 20 from each of the battery groups 31a to 31d can be boosted or decreased by a desired value.

For example, according to the charging and discharging control system 1 according to the modified example of the first embodiment, it is possible to boost voltages of the battery groups 31a to 31d and apply them to the electrical load 20 as described below. In the following description, the battery group 31a is taken as an example and described.

First, in an initial state, both the switching element 42a and the switching element 43a are in the non-connected state, that is, the battery group 31a and the electrical load 20 are in the non-connected state. In this initial state, the switching operation control unit 104 of the charging and discharging control device 100 sends a switch-ON signal to the switching element 43a, and thereby the collector terminal and emitter terminal of the switching element 43a are in the connected state, and current flows into the battery group 31a and the coil 47a. In this state, the switching operation control unit 104 sends a switch-OFF signal to the switching element 43a, and thereby the collector terminal and emitter terminal of the switching element 43a are in the non-connected state and an induced electromotive force is generated in the coil 47a. Then, the switching operation control unit 104 sends a switch-ON signal to the switching element 42a, and thereby the collector terminal and emitter terminal of the switching element 42a are in the connected state, that is, the battery group 31a and the electrical load 20 are in the connected state, and a voltage obtained by adding the induced electromotive force of the coil 47a to an electromotive force of the battery group 31a is applied to the electrical load 20. The magnitude of the induced electromotive force of the coil 47a can be adjusted by a time from sending a switch-ON signal to sending a switch-OFF signal to the switching element 43a.

Effect of Charging and Discharging Control Device According to a Modified Example of the First Embodiment According to the charging and discharging control device 100 according to the modified example of the first embodiment, since the DC/DC converters 40a to 40d are used as the switching devices 40a to 40d, when control is performed such that all connections between the four battery groups 31a to 31d and the electrical load 20 are in the connected state, that is, when the battery groups 31a to 31d are controlled in the second control mode, even though magnitudes of voltages (electromotive forces) of the battery groups 31a to 31d are not the same, it is possible to apply the same voltage to the electrical load 20 by appropriately boosting the voltages of the battery groups 31a to 31d. As a result, it is possible to avoid a situation in which a part of the battery groups 31a to 31d constituting the battery pack 30 are not discharged to improve efficiency of power, and to properly manage the application from each of the battery groups 31a to 31d of the battery pack 30 to the electrical load 20.

Furthermore, according to the charging and discharging control device 100 according to the modified example of the first embodiment, even when there is a difference in voltages (electromotive force) of the battery groups 31a to 31d when the battery groups 31a to 31d are controlled in the second control mode, since the same voltage can be applied to the electrical load 20 by boosting or decreasing the voltages, it is possible to eliminate a constraint on a connection time at the time of connecting a part of the four battery groups 31a to 31d to the electrical load 20. For example, when the battery groups 31a to 31d are controlled in the first control mode, it is possible to set a connection time at the time of connecting the battery groups to the electrical load 20 to be extremely long for only one battery group. In addition, it is unnecessary to adjust the connection time among the battery groups 31a to 31d.

As described above, the embodiment of the present invention has been described in detail with reference to drawings, but a specific configuration is not limited to those described above, and various design changes and the like can be made. For example, in the first embodiment of the present invention, a case in which a battery pack includes a switching device has been described, but the battery pack and the switching device may be separate devices.

Moreover, a case in which a predetermined connection time for connecting the battery group 31a to the electrical load 20 is set to the same connection time for all of the four battery groups 31a to 31d has been described in any one of the embodiments described above, but, for example, the predetermined connection time may be set for each of a plurality of battery groups in accordance with an arrangement of the plurality of battery groups in the battery pack 30. Specifically, for example, a battery group which is disposed more outward in the battery pack 30 and more easily affected by low temperature of the outside air may take longer connection time than a battery group which is not easily affected by the outside air to perform extra heating, and thereby it is possible to eliminate unevenness in temperature between the plurality of battery groups constituting the battery pack 30 and to exhibit heating efficiency. Likewise, the predetermined connection time may be set in accordance with a shape of the battery pack 30 or the plurality of battery groups.

In addition, a case in which the solo connection processing is performed on all of the battery groups unless the measured temperature of the battery pack does not reach a predetermined determination temperature has been described in any one of the embodiments described above, but, for example, the charging and discharging control device 100 may control only one battery group in the first control mode, and perform a control in the second control mode after the solo connection processing of the one battery group to an electrical load ends. Therefore, the number of battery groups to be controlled in the first control mode may be any number. As a result, for example, it is possible to perform control with simple setting without complicated setting in a case in which only preheating is performed, and the like.

Figure 6:
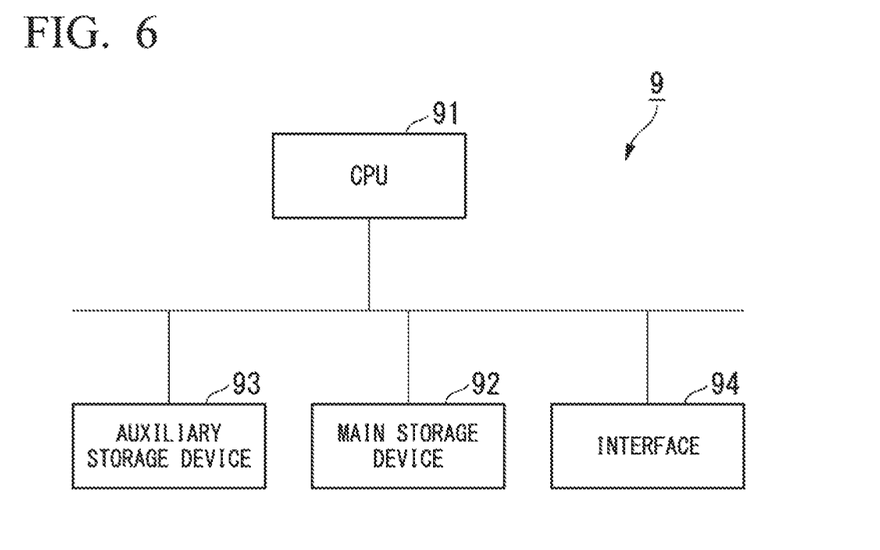
FIG. 6 is a schematic block diagram which shows a configuration of a computer according to at least one embodiment.

FIG. 6 is a schematic block diagram which shows a configuration of a computer according to at least one embodiment.

A computer 9 includes a CPU 91, a main storage device 92, an auxiliary storage device 93, and an interface 94.

The charging and discharging control device 100 described above includes the computer 9. The operation of each processing unit described above is stored in the auxiliary storage device 93 in the form of program. The CPU 91 reads a program from the auxiliary storage device 93, develops the program in the main storage device 92, and executes the above processing according to the program. For example, the temperature measurement unit 102, the temperature determination unit 103, and the switching operation control unit 104 described above may be the CPU 91.

In addition, the CPU 91 secures a storage area corresponding to each database described above in the main storage device 92 or the auxiliary storage device 93 according to the program. For example, the control information database 101 described above may be secured in the main storage device 92 or the auxiliary storage device 93.

In addition, for example, the temperature sensor 33 may be provided as separate hardware (not shown).

Examples of the auxiliary storage device 93 includes a hard disk drive (HDD), a solid state drive (SSD), a magnetic disk, a magneto-optical disc, a compact disc read only memory (CD-ROM), a digital versatile disc read only memory (DVD-ROM), a semiconductor memory, and the like. The auxiliary storage device 93 may be an internal media directly connected to a bus of the computer 9, and may also be an external media connected to the computer 9 via the interface 94 or a communication line. In addition, when this program is delivered to the computer 9 via a communication line, the computer 9 which has received this delivery may develop the program in the main storage device 92, and execute the above processing. In at least one embodiment, the auxiliary storage device 93 is a non-transitory tangible storage medium.

In addition, the program may be a program for realizing a part of the functions described above. Further, the program may be a program, a so-called difference file (a difference program) for realizing the functions described above in combination with other programs already stored in the auxiliary storage device 93.

INDUSTRIAL APPLICABILITY

According to the charging and discharging control device, it is possible to control the charging and discharging of a battery pack so as to easily heat a secondary battery without increasing the size of the secondary battery or surrounding devices.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

REFERENCE SIGNS LIST

1 Charging and discharging control system
20 Electrical load
30 Battery pack
31a to 31d Battery group
32 Battery
33 Temperature sensor
40a to 40d Switching device
41a1 to 41d1 Switching element
41a2 to 41d2 Switching element
42a to 42d Switching element
43a to 43d Switching element
44a to 44d Diode
45a to 45d Diode
46a to 46d Capacitor
47a to 47d Coil
100 Charging and discharging control device
101 Control information database
102 Temperature measurement unit
103 Temperature determination unit
104 Switching operation control unit

The invention claimed is:

1. A charging and discharging control device which is configured to control charging and discharging of a battery pack which includes a plurality of battery groups connected to an electrical load in parallel, and a plurality of switching devices each connected to the plurality of battery groups and performing a switching operation to switch between a connected state and a non-connected state of the plurality of battery groups to the electrical load, the charging and discharging control device comprising:

a temperature measurement unit configured to measure a temperature of the battery pack;

a temperature determination unit configured to receive an input of a measured temperature of the battery pack measured by the temperature measurement unit and to determine whether the measured temperature has reached a predetermined determination temperature; and a switching operation control unit configured to control the switching operations of the plurality of switching devices in a first control mode such that only a part of the plurality of battery groups are connected to the electrical load when the measured temperature of the battery pack has not reached the predetermined determination temperature when discharging of the battery pack is performed, and to control the switching operations of the plurality of switching devices in a second control mode such that all of the plurality of battery groups are connected to the electrical load when the measured temperature of the battery pack has reached the predetermined determination temperature when discharging of the battery pack is performed.

2. The charging and discharging control device according to claim 1,
wherein in the first control mode, the switching operation control unit is configured to control the switching operations of the plurality of switching devices such that the plurality of battery groups are sequentially connected to the electrical load one by one only for a predetermined connection time.

3. The charging and discharging control device according to claim 2,
wherein the predetermined connection time is set to the same time for all of the plurality of battery groups.

4. The charging and discharging control device according to claim 2,
wherein the predetermined connection time is set for each of the plurality of battery groups in accordance with an arrangement of the plurality of battery groups in the battery pack.

5. The charging and discharging control device according to claim 1,
wherein the switching device is a switching element.

6. The charging and discharging control device according to claim 1,
wherein the switching device is a DC/DC converter.

7. A charging and discharging control system which is configured to control charging and discharging of a battery pack comprising:
the charging and discharging control device according to claim 1, and the battery pack.

8. A charging and discharging control method which is configured to control charging and discharging of a battery pack which includes a plurality of battery groups connected to an electrical load in parallel, and a plurality of switching devices each connected to the plurality of battery groups and performing a switching operation to switch between a connected state and a non-connected state of the plurality of battery groups to the electrical load, the charging and discharging control method comprising:

a temperature measurement step of measuring a temperature of the battery pack;

a temperature determination step of receiving an input of a measured temperature of the battery pack measured in the temperature measurement step and determining whether the measured temperature has reached a predetermined determination temperature; and a switching operation control step of controlling the switching operations of the plurality of switching devices in a first control mode such that only a part of the plurality of battery groups are connected to the electrical load when the measured temperature of the battery pack has not reached the predetermined determination temperature when discharging of the battery pack is performed, and of controlling the switching operations of the plurality of switching devices in a second control mode such that all of the plurality of battery groups are connected to the electrical load when the measured temperature of the battery pack has reached the predetermined determination temperature when discharging of the battery pack is performed.

9. A non-transitory computer readable medium with a charging and discharging control program recorded therein, the charging and discharging control program is configured to cause a computer, as a charging and discharging control device for controlling charging and discharging of a battery pack that includes a plurality of battery groups connected to an electrical load in parallel, and a plurality of switching devices each connected to the plurality of battery groups and performing a switching operation to switch between a connected state and a non-connected state of the plurality of battery groups to the electrical load, to function as a temperature measurement unit configured to measure a temperature of the battery pack;

a temperature determination unit configured to receive an input of a measured temperature of the battery pack measured by the temperature measurement unit and to determine whether the measured temperature has reached a predetermined determination temperature; and a switching operation control unit configured to control the switching operations of the plurality of switching devices in a first control mode such that only a part of the plurality of battery groups are connected to the electrical load when the measured temperature of the battery pack has not reached the predetermined determination temperature when discharging of the battery pack is performed, and to control the switching operations of the plurality of switching devices in a second control mode such that all of the plurality of battery groups are connected to the electrical load when the measured temperature of the battery pack has reached the predetermined determination temperature when discharging of the battery pack is performed.

* * * * *